(12) United States Patent
Koehane et al.

(10) Patent No.: US 9,088,609 B2
(45) Date of Patent: Jul. 21, 2015

(54) LOGICAL PARTITION MEDIA ACCESS CONTROL IMPOSTOR DETECTOR

(75) Inventors: Susann M. Koehane, Austin, TX (US); Gerald F. McBrearty, Austin, TX (US); Shawn P. Mullen, Buda, TX (US); Jessica C. Murillo, Round Rock, TX (US); Johnny M. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 667 days.

(21) Appl. No.: 12/647,345

(22) Filed: Dec. 24, 2009

(65) Prior Publication Data

US 2011/0161653 A1   Jun. 30, 2011

(51) Int. Cl.
*H04L 29/06* (2006.01)

(52) U.S. Cl.
CPC ........ *H04L 63/1466* (2013.01); *H04L 63/1475* (2013.01)

(58) Field of Classification Search
CPC ............ H04L 63/1475; H04L 63/1483; H04L 63/1466
USPC ...................................... 713/150; 726/22–23
See application file for complete search history.

(56) References Cited

U.S. PATENT DOCUMENTS

| 6,226,744 | B1 | 5/2001 | Murphy et al. |
| 7,188,198 | B2 | 3/2007 | Beukema et al. |
| 7,213,065 | B2 * | 5/2007 | Watt .............................. 709/223 |
| 7,360,245 | B1 | 4/2008 | Ramachandran et al. |
| 7,386,698 | B2 | 6/2008 | Gimpl et al. |
| 7,565,495 | B2 * | 7/2009 | Kleinschnitz et al. ........ 711/154 |
| RE42,703 | E * | 9/2011 | Chen et al. ......................... 714/3 |
| 8,032,641 | B2 * | 10/2011 | Li et al. ......................... 709/227 |
| 8,387,114 | B2 * | 2/2013 | Sugarbroad ....................... 726/3 |
| 8,441,349 | B1 * | 5/2013 | Libby ........................... 340/541 |

(Continued)

FOREIGN PATENT DOCUMENTS

| CN | 101267312 | 9/2008 |
| JP | 2008-048252 A | 2/2008 |
| JP | 2009516969 A | 4/2009 |

OTHER PUBLICATIONS

Cuppens et al.; Alert correlation in a cooperative intrusion detection framework; Published in: Security and Privacy; 2002; Proceedings. 2002 IEEE Symposium on; Date of Conference: 2002; pp. 202-215; IEEE Xplore.*

(Continued)

*Primary Examiner* — Bradley Holder
(74) *Attorney, Agent, or Firm* — Thomas E. Tyson; Gregory K. Goshorn; Greg Goshorn, P.C.

(57) ABSTRACT

Provided are techniques for to enable a virtual input/output server (VIOS) to establish cryptographically secure signals with target LPARs to detect an imposter or spoofing LPAR. The secure signal, or "heartbeat," may be configured as an Internet Key Exchange/Internet Protocol Security (IKE/IP-Sec) encapsulated packet (ESP) connection or tunnel. Within the tunnel, the VIOS pings each target LPAR and, if a heartbeat is interrupted, the VIOS makes a determination as to whether the tunnel is broken, the corresponding LPAR is down or a media access control (MAC) spoofing attach is occurring. The determination is made by sending a heartbeat that is designed to fail unless the heartbeat is received by a spoofing device.

20 Claims, 6 Drawing Sheets

(56) References Cited

U.S. PATENT DOCUMENTS

| | | | |
|---|---|---|---|
| 2002/0161891 A1* | 10/2002 | Higuchi et al. | 709/226 |
| 2003/0043853 A1 | 3/2003 | Doyle et al. | |
| 2003/0191911 A1* | 10/2003 | Kleinschnitz et al. | 711/154 |
| 2004/0268079 A1* | 12/2004 | Riedle et al. | 711/173 |
| 2006/0010031 A1* | 1/2006 | Higuchi et al. | 705/10 |
| 2006/0184690 A1 | 8/2006 | Milliken | |
| 2007/0250608 A1 | 10/2007 | Watt | |
| 2007/0263874 A1* | 11/2007 | Harran et al. | 380/277 |
| 2008/0040509 A1* | 2/2008 | Werb et al. | 709/242 |
| 2008/0177997 A1* | 7/2008 | Morais et al. | 713/153 |
| 2009/0019544 A1* | 1/2009 | Suffern et al. | 726/22 |
| 2009/0300317 A1 | 12/2009 | Hepkin et al. | |
| 2010/0175107 A1* | 7/2010 | Sugarbroad | 726/3 |
| 2011/0010560 A1* | 1/2011 | Etchegoyen | 713/189 |

OTHER PUBLICATIONS de Vivo et al.; Internet security attacks at the basic levels; Published in: Newsletter ACM SIGOPS Operating Systems Review; Homepage archive vol. 32 Issue 2, Apr. 1998; pp. 4-15; ACM Digital Library.*

Frost, "Realization of Natural Interfaces Using Lazy Functional Programming," ACM Computing Surveys, V. 38, No. 4, Art. 11, pp. 1-54, Dec. 2006.

Cong et al., "Improving Data Quality: Consistency and Accuracy," VLDB '07, Sep. 23-28, 2007, Vienna, Austria, pp. 315-326, Sep. 2007.

International Business Machines Corporation, "Method for Hardware Console Surveillance in a pSeries eServer," Research Disclosure: RD-447161-A, Jul. 2001.

International Search Authority, "Notification of Transmittal of the International Search Report and Written Opinion," Apr. 19, 2011.

* cited by examiner

LOGICAL PARTITION MEDIA ACCESS CONTROL IMPOSTOR DETECTOR

BACKGROUND

As processing demands have increased, computing systems have become both more complicated and interconnected. For example, a particular computing device may be partitioned into logical partitions, or "LPARs," each of which includes a subset of the computing device's resources virtualized as a separate computer. Also, computing systems have become increasingly interconnected via various types of networks such as local area networks (LANs) and the Internet. This complexity and interconnectivity has created a number of issues related to computer security.

Provided are methods for monitoring a number of computing devices for security attacks. The disclosed techniques include, among other things, establishing a plurality of cryptographically secure channels, each channel between a monitoring device and a monitored device of a plurality of monitored devices, each monitored device of the plurality of monitored devices associated with unique address; transmitting a heartbeat from the monitoring device to a first monitored device of the plurality of monitored devices via a first secure channel, corresponding to the first monitored device, of the plurality of secure channels; if a response to the heartbeat is received, transmitting a second heartbeat from the monitoring device to a second monitored device of the plurality of monitor devices via the first secure channel; and if a response to the heartbeat is not received, executing a spoofing detection scheme, comprising: transmitting a second heartbeat to the first monitored device via an address associated with a second monitored device; receiving a response to the second heartbeat; and determining that a spoofing attack has occurred by the fact that the response to the second heartbeat has been received.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

Figure 1:
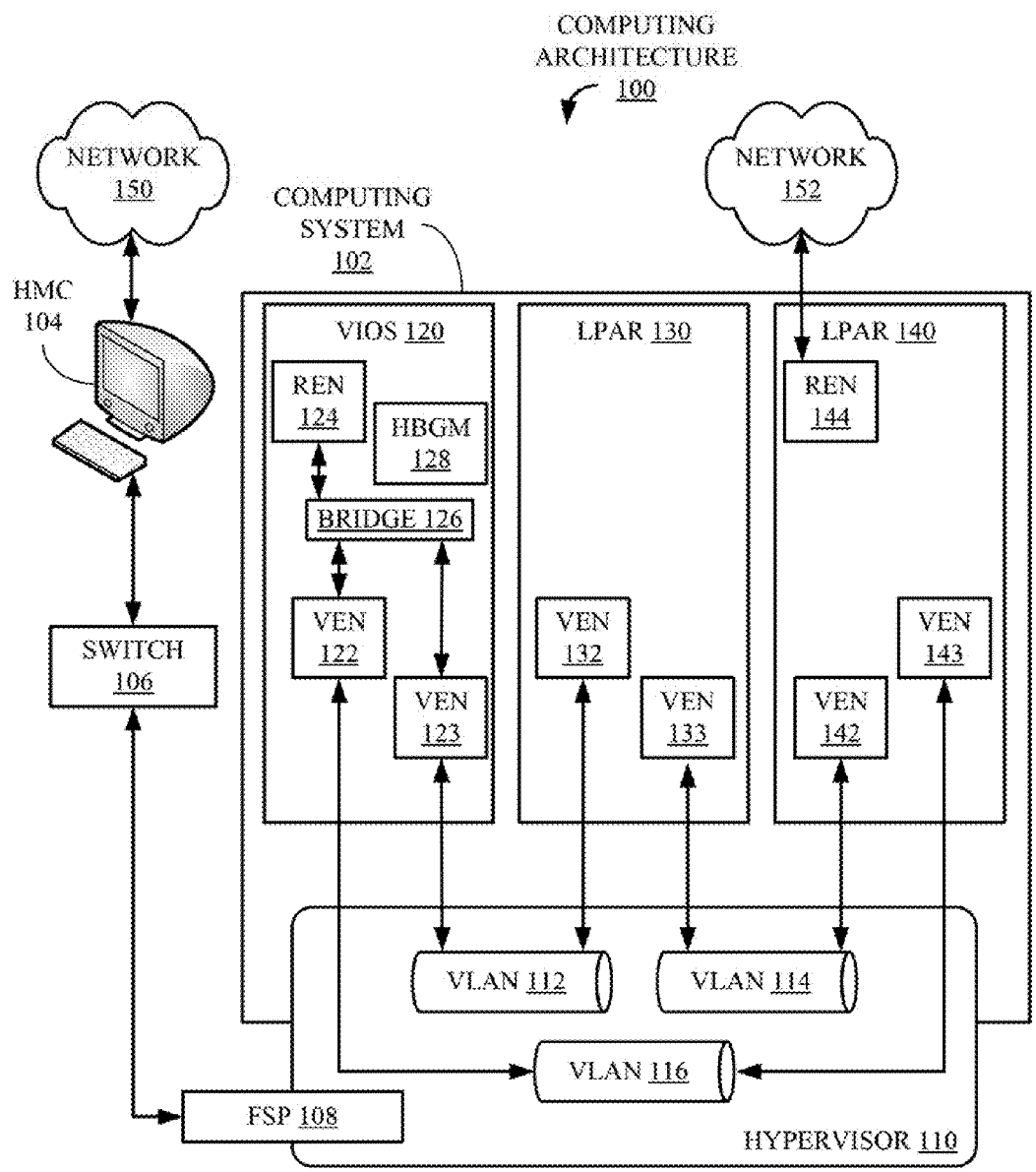
FIG. 1 is a block diagram of one example of a computing architecture that may implement the claimed subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Provided are techniques for to enable a virtual input/output server (VIOS) to establish cryptographically secure signals with target LPARs to detect an imposter or spoofing LPAR. The secure signal, or "heartbeat," may be configured as an Internet Key Exchange/Internet Protocol Security (IKE/IP-Sec) encapsulated packet (ESP) connection or tunnel. Within the tunnel, the VIOS pings each target LPAR and, if a heartbeat is interrupted, the VIOS makes a determination as to whether the tunnel is broken, the corresponding LPAR is down or a media access control (MAC) spoofing attach is occurring.

Turning now to the figures, FIG. 1 is a block diagram of one example of a computing architecture 100 that may implement the claimed subject matter. Computing architecture 100 includes a computing device 102, which would typically include a processor, memory, data busses, none of which are shown, but which should be familiar to those with skill in the computing arts. Processing space associated with computing system 102 is organized into logical partitions (LPARs), which for the purposes of this example include an LPAR 130 and an LPAR 140. As explained above in the Summary, an LPAR is a subset of a computer's resources, virtualized as a separate computing system. A virtual input/output server (VIOS) 120, in conjunction with a hypervisor 100, enables LPARs 130 and 140 to work in a coordinated manner.

Hypervisor 110 is accessed via a hypervisor management consol (HMC) 104 that is accessible via a network 150. HMC 104 is coupled to a switch 106, which is coupled to hypervisor 100 via a flexible service processor (BP) 108. Although not illustrated, HMC 104 would typically include at least a monitor, a keyboard and a pointing device, or "mouse," to enable human interaction. HMC 104 also typically includes a memory and a processor. Hypervisor 110 is communicatively coupled to other components of computing system 102, such as VIOS 120 and LPARs 130 and 140 via a number of virtual local area networks (VLANs) 112, 114 and 116. Specifically, in this example, VLAN 112 is coupled to a virtual Ethernet (VEN) 123, associated with VIOS 120, and a VEN 132, associated with LPAR 130. VLAN 114 is coupled to a VEN 133, associated with LPAR 130, and a VEN 142, associated with LPAR 140. VLAN 116 is coupled to a VEN 122, associated with VIOS 120, and a VEN 143, associated with LPAR 140.

VENs 122 and 123 of VIOS 120 are also coupled to a bridge 126 that provides a connection to a real Ethernet (REN) 124. LPAR 140 also includes a REN 144, which is coupled to a network 152. It should be understood that VLANs 112, 114 and 116, VENs 122, 123, 132, 133, 142 and 143, RENs 124 and 144 and bridge 126 are used merely as examples throughout the Specification of components of an architecture 100 and a computing system 102 that may implement the claimed subject matter. In other words, as should be appreciated by one with skill in the computing and communication arts, architecture 100, computing system 102 and components 112, 114, 116, 122, 123, 124, 126, 132, 133, 142 and 143 and 144 provide a large degree of flexibility for the various components to communicate with each other and, via networks 150 and 152, with users and other computing devices.

VIOS 120 also includes a Heartbeat Generation and Monitor (HBGM) component 128. HBGM 128 provides memory and logic for one implementation of the claimed subject matter. HBGM 128 is explained in more detail below in conjunction with FIGS. 2-6.

Figure 2:
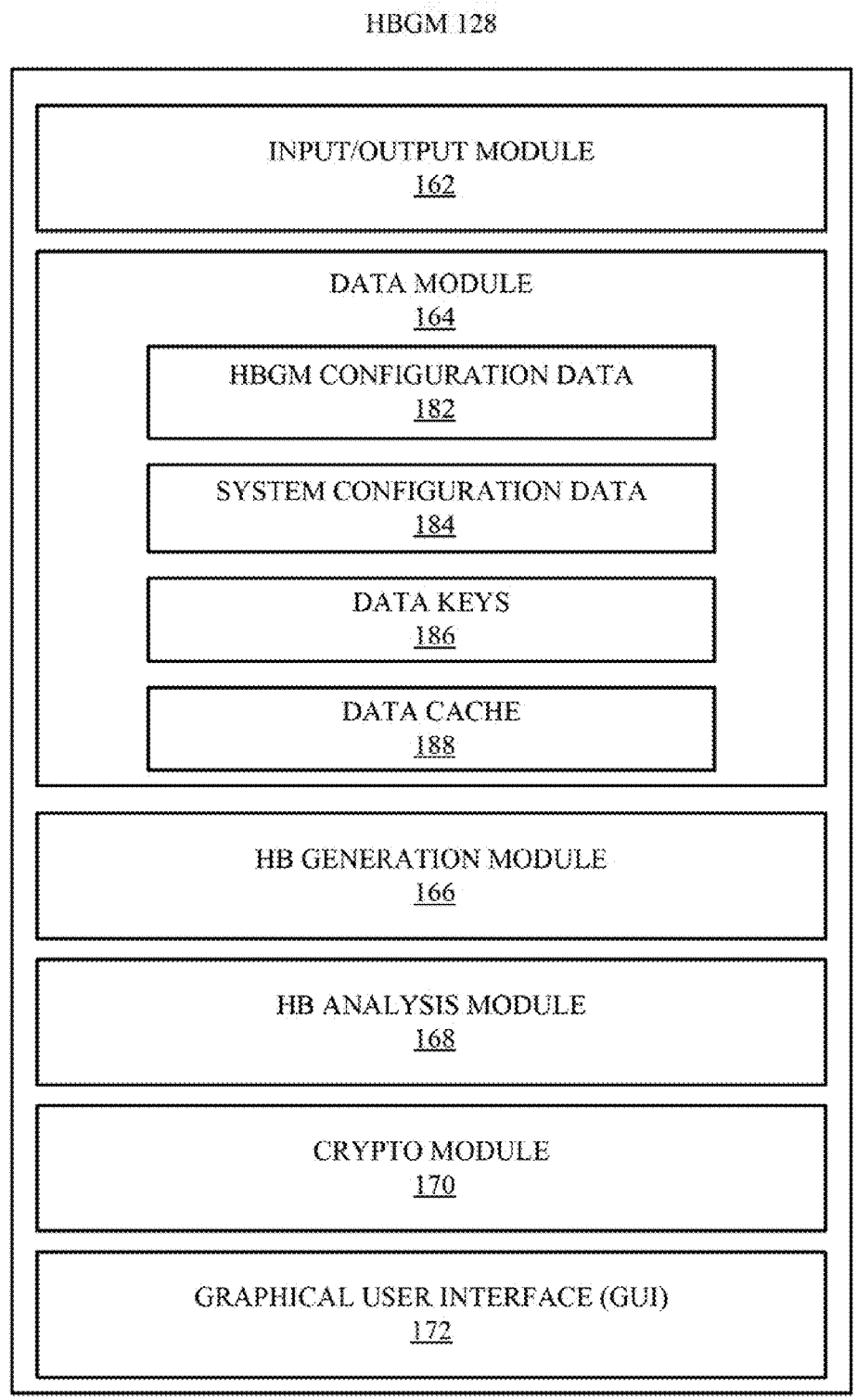
FIG. 2 is a block diagram of a Heartbeat Generation and Monitoring system (HBGM) that may be employed to implement the claimed subject matter.

FIG. 2 is a block diagram of HBGM 128, first introduced above in conjunction with FIG. 1, which may be employed to implement the claimed subject matter. HBGM 128 includes an input/output (I/O) module 162, a data module 164, a Heartbeat (HB) generation module 166, a HB analysis module 168, a cryptography (crypto) module 170 and a graphical user interface (GUI) module 172. For the sake of the following examples, HBGM 128 is assumed to execute on a processor associated with computing system 102 (FIG. 1) and stored in a data storage (not shown) associated with computing system 102. It should be understood that the claimed subject matter can be implemented in many types of computing systems and data storage structures but, for the sake of simplicity, is described only in terms of computer 102 and system architecture 100 (FIG. 1). Further, the representation of HBGM 128 in FIG. 2 is a logical model. In other words, components 162, 164, 166, 168, 170 and 172 may be stored in the same or separates files and loaded and/or executed within system 100 either as a single system or as separate processes interacting via any available inter process communication (IPC) techniques.

I/O module 162 handles any communication between HBGM 128 and other components of computing system 102, including the transmission of heartbeats generated by HB generation module 166. Data module 164 is a data repository for information, including parameters, settings and lists, which HBGM 128 requires during normal operation. Examples of the types of information stored in data module 164 include HBGM configuration data 182, system configuration data 184, a secure list of data keys 186 and a data cache 188. HBGM configuration data 182 stores parameters that may be set by a user or system administrator to control the operation of HBGM 128 (see 204, FIG. 3). Examples include, but are not limited to, a parameter that determines a number of ignored heartbeats before an action is taken (see FIGS. 4 and 5) and information concerning authorized users. System configuration data 184 stores information concerning computing system 102, including the various components, which HBGM 128 utilizes during operation (see 206, FIG. 3). Data keys 186 is a cryptographically secure area for storing session keys to enable secure communication between HBGM 128 and other components of computing system 102, including LPARs 130 and 140. Data cache 188 stores any interim results of processing executed by HBGM 128.

Figure 3:
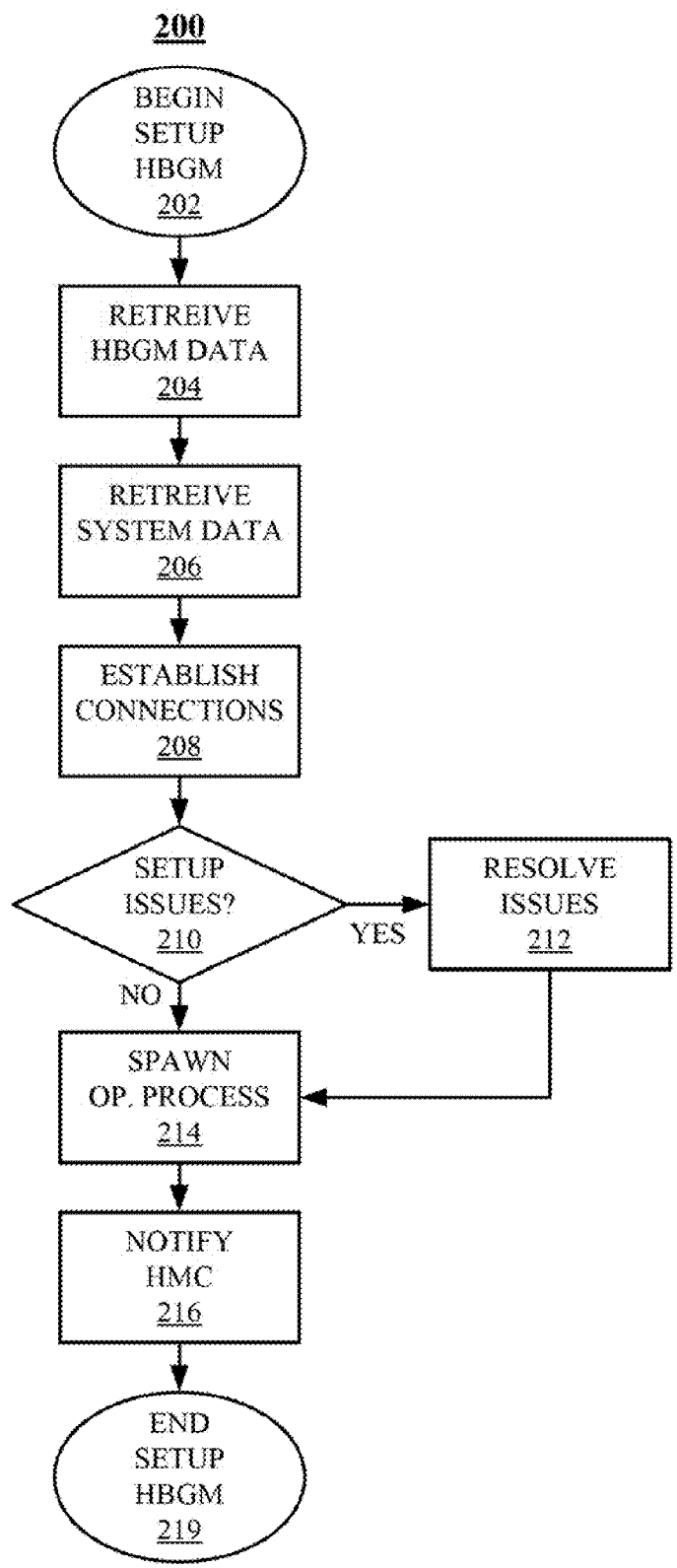
FIG. 3 is a flowchart of a Setup HBGM process corresponding to the HBGM of FIG. 2.
Figure 4:
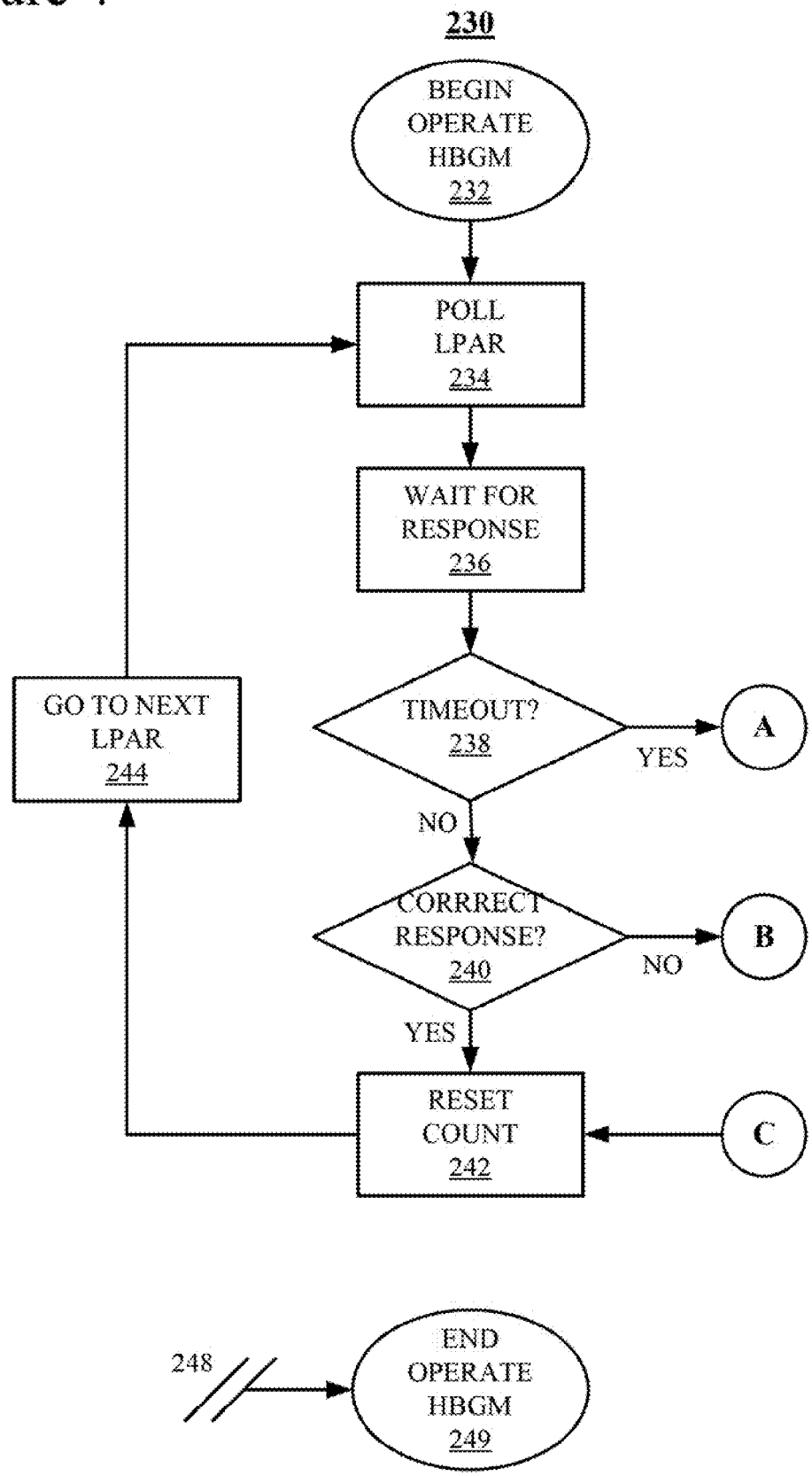
FIG. 4 is a flowchart of an Operate HBGM process corresponding to the HBGM of FIG. 2.

HB generation module 166 executes logic for the generation of heartbeats transmitted from HBGM 128 and VIOS 120 (FIG. 1) and LPARs 130 and 140 (see 234, FIG. 4). HB analysis module 168 analyses responses to heartbeats generated by module 166, including initiating action in response to an anomalous or missing heartbeat (see 238 and 240, FIG. 4). Cryptography (crypto) module 170 encrypts and decrypts communications between HBGM 128 and the other components of computing system 102 by employing session keys stored in data keys 186. GUI component 172 enables administrator and other users of HBGM 128 to interact with and to define the desired functionality of HBGM 128. In the alternative, a GUI for interaction with HBGM 128 may be incorporated into HMC 104 (FIG. 1). Components 162, 164, 166, 168, 170, 172, 182, 184, 186 and 188 are described in more detail below in conjunction with FIGS. 3-5.

FIG. 3 is a flowchart of a Setup HBGM process 200 corresponding to HBGM 128 of FIGS. 1 and 2. In this example, logic associated with process 200 is stored and executed on computing system 102 (FIG. 1) as part of HBGM 128 (FIGS. 1 and 2). Process 200 starts in a "Begin Setup Heartbeat Generation and Monitor System (HBGM)" block 202 and proceeds immediately to a "Retrieve HBGM Data" block 204. During block 204, process 200 retrieves configuration data (see 182, FIG. 2) that controls the operation of HBGM 128 (see 230, FIG. 4). As described above in conjunction with FIG. 2, examples of configuration data include, but are not limited to, a parameter that determines a number of ignored heartbeats before an action is taken (see FIGS. 4 and 5) and information concerning authorized users.

During a "Retrieve System Data" block 206, process 200 retrieves information relating to the system on which HBGM 128 is installed and expected to monitor (see 184, FIG. 2), including information that enable HBGM 128 to establish a communication channel with each monitored device. This information typically includes cryptographic information (see 186, FIG. 2) to secure the established channels.

During an "Establish Connections" block 208, HBGM 128 establishes a secure communication channel with each monitored device such as LPAR 130 and 140 (FIG. 1) by employing the information retrieved during blocks 204 and 206. One example of a suitable secure connection, employed for descriptive purposes during the remainder of the Specification, is an Internet Key Exchange/Internet Protocol Security (IKE/IPSec) encapsulated packet (ESP) connection/tunnel although one with skill in the computing or communication arts should know of other suitable technologies. Each monitored LPAR 130 and 140 may share the same IKE key because the IKE protocol establishes a unique session key for each connection. A unique pre-shared key may also be used between each LPAR 130 and 140 and VIOS 120 (FIG. 1). In one embodiment, the initial handshake employs Diffie-Helman to protect the communication.

During a "Setup Issues?" block 210, process 200 determines whether or not the channel establishment activities of block 208 have completed successfully. One of many possible examples of a communication issue that may arise is an inability to create a secure connection with a particular device. If a setup issue is detected, process 200 proceeds to a "Resolve Issues" block 212 during which the issue is addressed, by means of programmatic actions, by notification of a system administrator who takes action or by some combination of the two.

One all setup issues have been resolved during block 212 or, if during block 210, process 200 determines that no issues have been detected, control proceeds to a "Spawn Operating Process" block 214 during which an operation process (see 230, FIG. 4) is executed. Once the operation process is launched, a notice of this information is transmitted to HMC 104 (FIG. 1) and a system administrator, a log file or both during a "Notify HMC" block 216. Finally, process 200 proceeds to an "End Setup HBGM" block 219 in which process 200 is complete.

FIG. 4 is a flowchart of an Operate HBGM process 230 corresponding to HBGM 128 of FIGS. 1 and 2. Like process 200 (FIG. 3), logic associated with process 230 is stored and executed on computing system 102 (FIG. 1) as part of HBGM 128 (FIGS. 1 and 2). Process 230 starts in a "Begin Operate HBGM" block 232 and proceeds immediately to a "Poll LPAR" block 234. During block 234, process 230 polls a LPAR such as LPAR 130 or 140 (FIG. 1) by transmitting a signal, or "heartbeat," through, in this example, the IKE/IPsec ESP tunnel established for the particular LPAR (see 208, FIG. 3). During a "Wait for Response" block 236, process 230 waits for a response from the signal transmitted during block 234. Typically, there are three (3) possible outcomes from the transmission of a heartbeat: 1) a timeout, 2) a correct response that indicates the correct LPAR has responded; or 3) a response that is suspicious.

During a "Timeout?" block 238, process 230 determines whether or not a sufficient time has passed with no response to the heartbeat transmitted during block 234. If one LPAR such as LPAR 130 or 140 is intercepting transmissions for the other, typically neither LPAR will respond to a heartbeat. If process 230 determines that a timeout has occurred, control proceeds to a Transition Point "A," which is explained in more detail below in conjunction with FIG. 5. If no timeout is detected, control proceeds to a "Correct Response?" block 240 during which process 230 determines whether or not a received heartbeat is appropriate for the particular LPAR 130 or 140 to which the heartbeat was intended. If spoofing is taking place, e.g. LPAR 130 is intercepting communication intended for LPAR 140, LPAR 130 is not able to respond appropriately to the heartbeat because the spoofing. LPAR 130 does not have the necessary unique session key of the spoofed LPAR 140.

If process 230 detects an incorrect or inappropriate response to the heartbeat transmitted during block 234, control proceeds to a Transition Point "B," which is described in more detail below in conjunction with FIG. 6. If process 230 determines during block 240 that a correct heartbeat has been received or, following processing associated with Transition Points A and B via a Transition Point C is completed, process 230 proceeds to a "Reset Count" block 242 during which process 230 resets a count (see FIG. 5) associated with the LPAR to which the heartbeat was transmitted. During a "Go to Next LPAR" block 244, process 230 selects another LPAR, returns to block 134 and processing continues as described above. Selection of a next LPAR may be based upon a round robin scheme or another scheme. For example, selection may be dependent upon a priority scheme or based upon detection of a possible issue with a particular LPAR.

Finally, process 230 is halted by means of an asynchronous interrupt 248, which passes control to an "End Operate HBGM" block 249 in which process 230 is complete. Interrupt 248 is typically generated when the OS, VIOS or HBGM of which processes 230 is a part is itself halted, either explicitly by a system administrator or because of a power down situation. During nominal operation, process 230 continuously loops through the blocks 234, 236, 238, 240, 242 and 244, transmitting heartbeats to each protected device.

Figure 5:
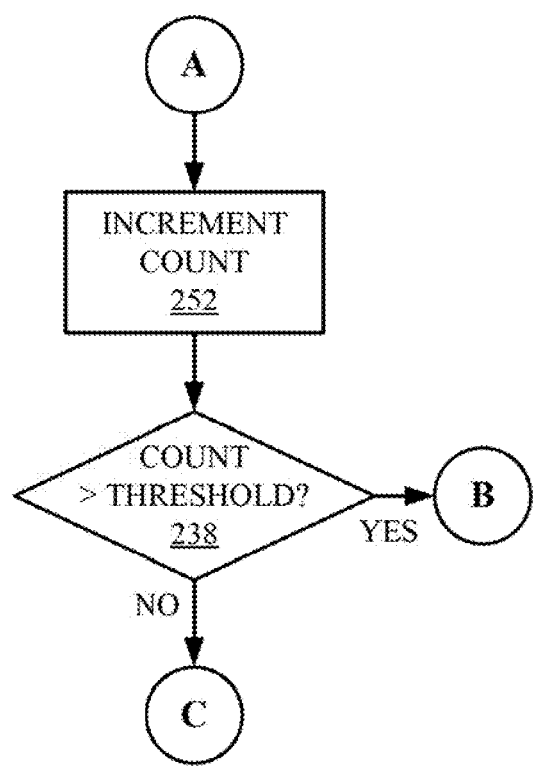
FIG. 5 is a flowchart of one example of exception processing associated with the Operate HBGM process of FIG. 4.

FIG. 5 is a flowchart of one example of exception processing code 250 associated with Operate HBGM process 230 of FIG. 4. Processing code 250 starts in Transition Point A (FIG. 4) and proceeds immediately to an "Increment Count" block 262. During block 262, process code 250, increments a count parameter associated with the LPAR to which the heartbeat was transmitted. During a "Count>Threshold?" block 264, process code 250 determines whether or not the count has exceeded a preset parameter (see 182, FIG. 2). The value of the parameter may be set to '1' indicating that action needs to be taken upon the detection of a single missing heartbeat or to some greater value depending upon the desired sensitivity of the system. If the count exceeds the allowable count, control proceeds to Transition Point B (FIG. 4), which is described in more detail below in conjunction with FIG. 6. If the count does not exceed the threshold, control proceeds to Transition Point C (FIG. 4) and control returns to process 230 (FIG. 4).

Figure 6:
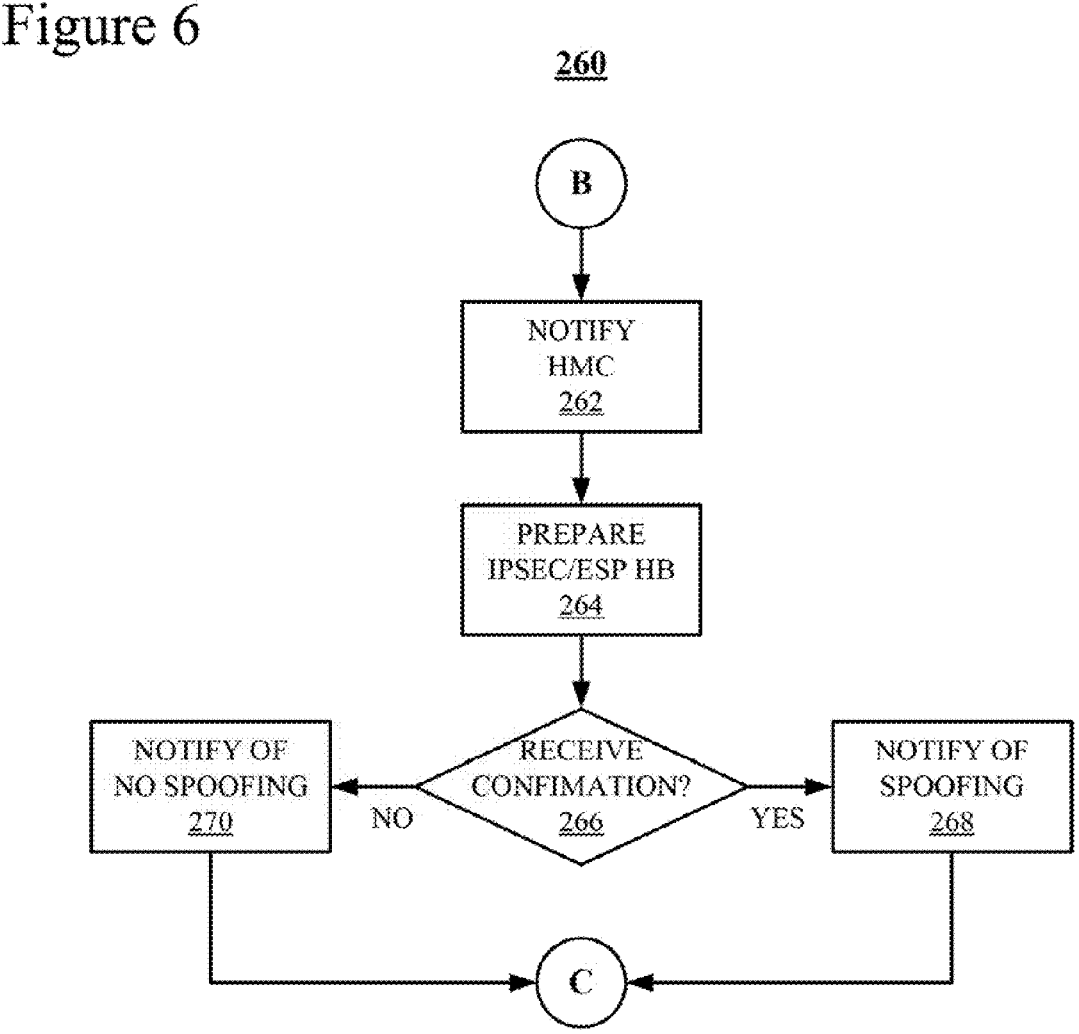
FIG. 6 is a flowchart of a second example of exception processing associated with Operate HBGM process of FIG. 4.

FIG. 6 is a flowchart of a second example of exception processing code 260 associated with Operate HBGM process 230 of FIG. 4. Processing code 260 starts in Transition Point B (FIG. 4) and proceeds immediately to a "Notify Hypervisor Management Consol (HMC)" block 262. During block 262, process code 260 transmits a notice to HMC 104 (FIG. 1) with an indication that an anomalous event has occurred. At this point a system administrator may decide to investigate. An automatic response begins execution during a "Prepare IPsec/ESP Heartbeat (HB)" block 264. During block 264, VIOS 120 (FIG. 1) prepares an IPsec/ESP heartbeat for the target system. However, the media access control (MAC) address is set to the MAC address of the device that is suspected of spoofing. Since the MAC address is not part of the IPsec/ESP packet, the spoofing device will be able to respond to the heartbeat but the original target will not. In other words, the transmitted heartbeat is designed to fail unless the heartbeat is received by a spoofing device. Of course, a spoofing device will not be able to make this determination and will therefore respond to the heartbeat and thus reveal the attack.

During a "Receive Confirmation?" block 266, process code 260 determines whether or not a confirmation heartbeat has been received. If so, control proceeds to a "Notify of Spoofing" block 268 during which HMC 104 is notified by HBGM 128 (FIGS. 1 and 2) that the spoofing attack of which HMC 104 was warned during block 262 has been established as occurring. If not, during a "Notify of Non-Spoofing" block 270, HMC 104 is notified that the warning transmitted during block 262 has been resolved. Finally, process code 260 proceeds to Transition Point C (FIG. 4) and control returns to process 230.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method, comprising:
    establishing, by a plurality of processors, at least one of which is a hardware processor, a plurality of cryptographically secure channels, each channel between a monitoring device and a corresponding monitored device of a plurality of monitored devices, each monitored device of the plurality of monitored devices associated with a corresponding unique address of a plurality of addresses;
    transmitting a first heartbeat from the monitoring device to a first monitored device of the plurality of monitored devices via a first secure channel, corresponding to the first monitored device, of the plurality of secure channels;
    determining that a response to the first heartbeat has not been received;
    in response to the determining that the first heartbeat has not been received, executing a spoofing detection scheme, comprising:
        transmitting a second heartbeat to the first monitored device via the corresponding unique address associated with a second monitored device;
        receiving a response to the second heartbeat; and
        determining that a spoofing attack has occurred in response to receiving the response to the second heartbeat; and
    in response to a determination that a response to the second heartbeat has not been received, determining that either the first channel is broken or the first monitored device is inoperative.

2. The method of claim 1, wherein the monitored devices are logical partitions (LPARs) of a computing device.

3. The method of claim 1, wherein the monitoring device is a virtual input/output server (VIOS) of the computing device.

4. The method of claim 1, wherein the cryptographically secure channels are based on an Internet Key Exchange/Internet Protocol Security (IKE/IPSec) encapsulated packet (ESP) protocol.

5. A method, comprising:
establishing by a hypervisor, executing on a plurality of processors, at least one of which is a hardware processor, coupled to a computing system, a plurality of cryptographically secure channels, each channel between a monitoring device of the computing system and a monitored device of a plurality of monitored deices of the computing system, each monitored device associated with a corresponding unique address of a plurality of addresses;
transmitting a first heartbeat from the monitoring device to a first monitored device of the plurality of monitored devices via a first secure channel, corresponding to the first monitored device, of the plurality of secure channels;
determining that a response to the first heartbeat has not been received;
in response to the determining that the first heartbeat has not been received, executing a spoofing detection scheme, comprising:
  transmitting a second heartbeat to the first monitored device via the corresponding unique address associated with a second monitored device;
  receiving a response to the second heartbeat; and
  determining that a spoofing attack has occurred in response to receiving the response to the second heartbeat; and
in response to a determination that a response to the second heartbeat has not been received, determining that either the first channel is broken or the first monitored device is inoperative.

6. The method of claim 5, wherein the monitored devices are logical partitions (LPARs) of the computing device.

7. The method of claim 6, wherein the monitoring device is a virtual input/output server (VIOS) associated with the hypervisor.

8. The method of claim 5, wherein the cryptographically secure channels are based on an Internet Key Exchange/ Internet Protocol Security (IKE/IPSec) encapsulated packet (ESP) protocol.

9. A method, comprising:
establishing, by a plurality of processors, at least one of which is a hardware processor, a plurality of cryptographically secure channels, each channel between a virtual input/output server (VIOS) and a monitored device of a plurality of monitored devices, each monitored device associated with a corresponding unique address of a plurality of addresses;
transmitting a first heartbeat from the VIOS to a first monitored device of the plurality of monitored devices via a first secure channel, corresponding to the first monitored device, of the plurality of secure channels;
determining that a response to the first heartbeat has not been received;
in response to the determining that the first heartbeat has not been received, executing a spoofing detection scheme, comprising:
  transmitting a second heartbeat to the first monitored device via the corresponding unique address associated with a second monitored device;
  receiving a response to the second heartbeat; and
  determining that a spoofing attack has occurred in response to receiving the response to the second heartbeat; and
in response to a determination that a response to the Second heartbeat has not been received, determining that either the first channel is broken or the first monitored device is inoperative.

10. The method of claim 9, wherein the monitored devices are logical partitions (LPARs) of the computing device.

11. The method of claim 9, wherein the VIOS is associated with a hypervisor.

12. The method of claim 9, wherein the cryptographically secure channels are based on an Internet Key Exchange/ Internet Protocol Security (IKE/IPSec) encapsulated packet (ESP) protocol.

13. An apparatus, comprising:
a plurality of processors, at least one of which is a hardware processor;
a non-transitive, computer-readable storage medium coupled to the plurality of processors; and
logic, stored on the computer-readable storage medium and executed on the plurality of processors, for:
  establishing a plurality of cryptographically secure channels, each channel between a monitoring device and a corresponding monitored device of a plurality of monitored devices, each monitored device of the plurality of monitored devices associated with a corresponding unique address of a plurality of addresses;
  transmitting a first heartbeat from the monitoring device to a first monitored device of the plurality of monitored devices is a first secure channel, corresponding to the first monitored device, of the plurality of secure channels;
  determining that a response to the first heartbeat has not been received;
  in response to the determining that the first heartbeat has not been received, executing a spoofing detection scheme, comprising:
    transmitting a second heartbeat to the first monitored device via the corresponding unique address associated with a second monitored device:
    receiving a response to the second heartbeat; and
    determining that a spoofing attack has occurred in response to receiving the response to the second heartbeat; and
  in response to a determination that a response to the second heartbeat has not been received, determining that either the first channel is broken or the first monitored device is inoperative.

14. The apparatus of claim 13, wherein the monitored devices are logical partitions (LPARs) of a computing device.

15. The apparatus of claim 13, wherein the monitoring device is a virtual input/output server (VIOS) of the computing device.

16. The apparatus of claim 13, wherein the cryptographically secure channels are based on an Internet Key Exchange/ Internet Protocol Security (IKE/IPSec) encapsulated packet (ESP) protocol.

17. A computer programming product, comprising:
a non-transitive, computer-readable storage medium; and
logic, stored on the computer-readable storage medium for execution on a plurality of processors, at least one of which is a hardware processor, for:
  establishing a plurality of cryptographically secure channels, each channel between a monitoring device and a corresponding monitored device of a plurality of monitored devices, each monitored device of the plurality of monitored devices associated with a corresponding unique address of a plurality of addresses;

transmitting a first heartbeat from the monitoring device to a first monitored device of the plurality of monitored devices via a first secure channel, corresponding to the first monitored device, of the plurality of secure channels;

determining that a response to the first heartbeat has not been received;

in response to the determining that the first heartbeat has not been received, executing a spoofing detection scheme, comprising:

transmitting a second heartbeat to the first monitored device via the corresponding unique address associated with a second monitored device;

receiving a response to the second heartbeat; and determining that a spoofing attack has occurred in response to receiving the response to the second heartbeat; and in response to a determination that a response to the second heartbeat has not been received, determining that either the first channel is broken or the first monitored device is inoperative.

18. The computer programming product of claim 17, Wherein the monitored devices are logical partitions (LPARs) of a computing device.

19. The computer programming product of claim 17, wherein the monitoring device is a virtual input/output server (VIOS) of the computing device.

20. The computer programming product of claim 17, wherein the cryptographically secure channels are based on an Internet Key Exchange/Internet Protocol Security (IKE/IPSec) encapsulated packet (ESP) protocol.

* * * * *